United States Patent
Steele et al.

(10) Patent No.: US 8,667,874 B2
(45) Date of Patent: Mar. 11, 2014

(54) PLIERS HAVING WIRE STRIPPERS

(75) Inventors: Michael S. Steele, Waukesha, WI (US);
Wade Burch, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 321 days.

(21) Appl. No.: 13/005,342

(22) Filed: Jan. 12, 2011

(65) Prior Publication Data

US 2011/0167642 A1 Jul. 14, 2011

Related U.S. Application Data

(60) Provisional application No. 61/294,290, filed on Jan. 12, 2010.

(51) Int. Cl.
*B25B 7/14* (2006.01)
(52) U.S. Cl.
USPC .............................................. 81/318; 81/319
(58) Field of Classification Search
USPC ......... 81/9.4, 318–321, 324, 331, 417, 427.5, 81/489
See application file for complete search history.

(56) References Cited

U.S. PATENT DOCUMENTS

| | | |
|---|---|---|
| 776,879 A | 12/1904 | Wolfe |
| 1,388,398 A | 8/1921 | Adams |
| 2,594,363 A | 4/1952 | Stephenson |
| 2,668,464 A | 2/1954 | Paules |
| 2,674,796 A | 4/1954 | Herold |
| 2,742,698 A | 4/1956 | McGary et al. |
| 2,990,735 A | 7/1961 | Manning |
| 3,044,081 A | 7/1962 | Robinson, Jr. |
| 3,092,152 A | 6/1963 | Neff |
| 3,339,281 A | 9/1967 | Chow |
| 3,416,226 A | 12/1968 | Pfaffenback |
| 3,831,207 A | 8/1974 | Boyajian |
| 3,947,905 A | 4/1976 | Neff |

(Continued)

FOREIGN PATENT DOCUMENTS

| | | |
|---|---|---|
| EP | 0598467 | 5/1994 |
| JP | 10235032 | 9/1998 |

OTHER PUBLICATIONS

PCT/US2011/020961 International Search Report dated Sep. 29, 2011, 6 pages.

(Continued)

*Primary Examiner* — Robert Scruggs
(74) *Attorney, Agent, or Firm* — Michael Best & Friedrich LLP

(57) ABSTRACT

A hand tool includes a first jaw assembly and a second jaw assembly. The first jaw assembly includes a first handle portion, a first jaw portion, a first pivot portion disposed between first handle portion and the first jaw portion, and a first rail disposed on one of the first pivot portion and the first handle portion. The second jaw assembly includes a second handle portion, a second jaw portion, a second pivot portion disposed between the second handle portion and the second jaw portion, and a second rail disposed on one of the second pivot portion and the second handle portion. The second rail is shorter than the first rail. A lock button is slidingly coupled to the first rail and selectively slidingly coupled to the second rail. A resilient member disposed between the lock button and the first rail to inhibit sliding movement of the lock button.

20 Claims, 4 Drawing Sheets

(56) References Cited

U.S. PATENT DOCUMENTS

| | | |
|---|---|---|
| 4,104,752 A | 8/1978 | Amrein et al. |
| 4,337,542 A | 7/1982 | Theiler, Sr. |
| D327,826 S | 7/1992 | Neff |
| 5,179,783 A | 1/1993 | Melter |
| 5,263,254 A | 11/1993 | Orthey |
| 5,297,343 A | 3/1994 | Melter et al. |
| 5,323,502 A | 6/1994 | Miller |
| 5,377,412 A | 1/1995 | Schofield et al. |
| 5,987,755 A | 11/1999 | Shih |
| 6,029,297 A | 2/2000 | French |
| D421,376 S | 3/2000 | Neff |
| 6,301,787 B2 | 10/2001 | Mock |
| 6,336,272 B1 | 1/2002 | Lee |
| 6,588,039 B1 | 7/2003 | Bates |
| 6,618,885 B1 | 9/2003 | Blaustein |
| 6,619,158 B2 | 9/2003 | Bates et al. |
| D485,146 S | 1/2004 | Rivera |
| 6,687,991 B2 | 2/2004 | Murg |
| 6,691,403 B1 | 2/2004 | Murg |
| 6,739,217 B2 | 5/2004 | Hartranft |
| D494,032 S | 8/2004 | Rivera |
| 6,772,520 B1 | 8/2004 | Shih |
| 7,055,414 B2 | 6/2006 | Konen |
| 7,089,619 B2 | 8/2006 | Smith |
| 7,100,481 B2 | 9/2006 | Hartranft |
| 7,143,672 B1 | 12/2006 | Di Bitonto |
| 7,171,712 B2 | 2/2007 | Konen |
| 7,409,736 B2 | 8/2008 | Konen |
| 2004/0163495 A1* | 8/2004 | Konen .................. 81/9.4 |
| 2007/0144015 A1 | 6/2007 | Peterson et al. |
| 2008/0022533 A1 | 1/2008 | Zeller |
| 2009/0277019 A1 | 11/2009 | Mueller |

OTHER PUBLICATIONS

Australian Patent Examination Report No. 1 for Application No. 2011205382 dated Oct. 22, 2013 (3 pages).

Canadian Intellectual Property Office Action for Application No. 2,786,753 dated Nov. 18, 2013 (2 pages).

* cited by examiner

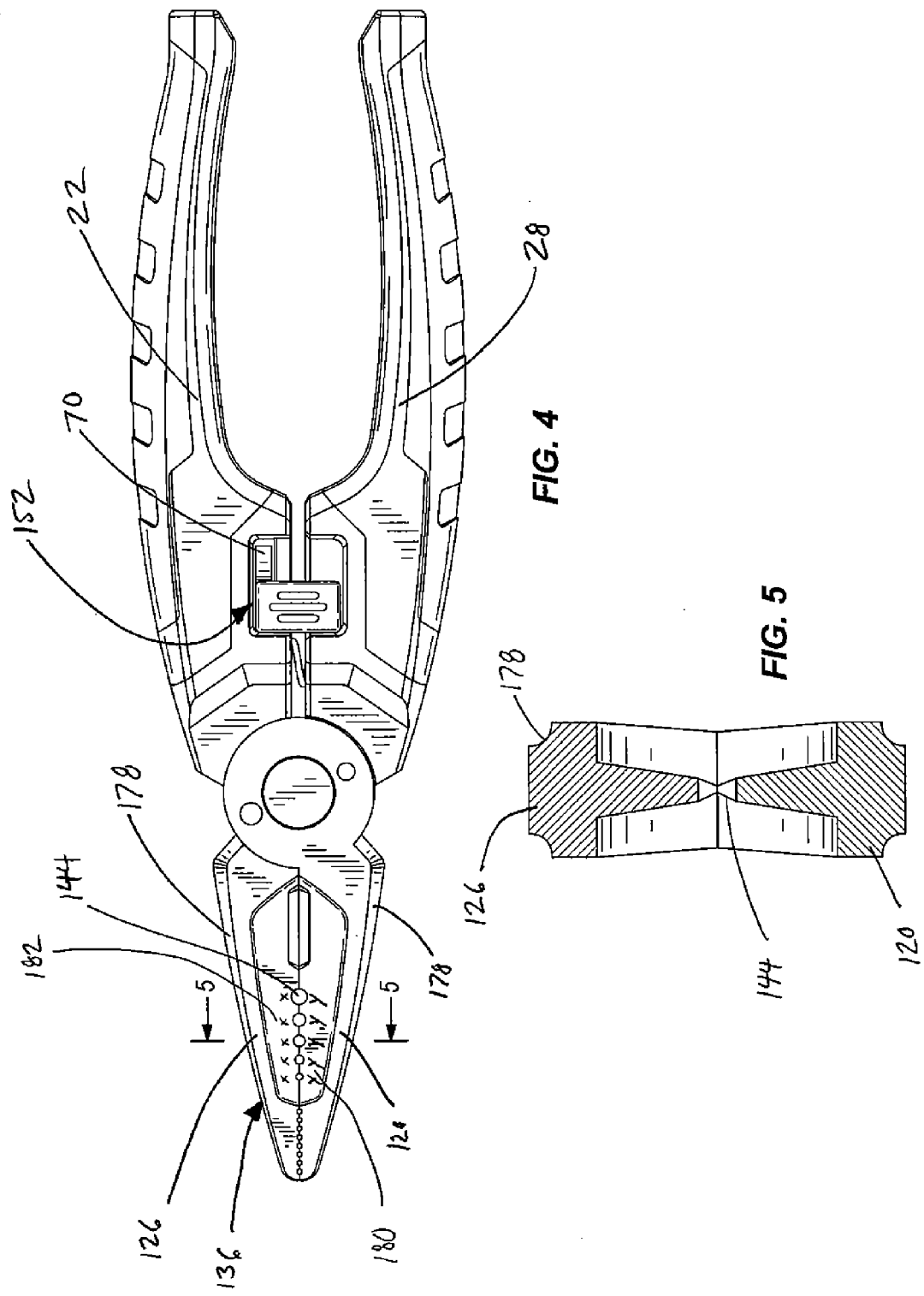

PLIERS HAVING WIRE STRIPPERS

CROSS-REFERENCE TO RELATED APPLICATION

This Application claims priority to U.S. Provisional Patent Application No. 61/294,290, filed Jan. 12, 2010, the entire contents of which are incorporated herein by reference.

BACKGROUND

The present invention relates to hand tools, and in particular, the invention relates to pliers that include a wire stripper and a sliding lock.

Pliers, especially an electrician's pliers may include such features as a wire stripper and wire cutter. When not in use, it may be desirable to lock the handles of the pliers together. When ready for use, it may be desirable to unlock the handles with one hand.

SUMMARY OF THE INVENTION

In one embodiment, the invention provides a hand tool having a first jaw assembly and a second jaw assembly. The first jaw assembly includes a first handle portion, a first jaw portion, a first pivot portion disposed between the first handle portion and the first jaw portion, and a first rail disposed on one of the first pivot portion and the first handle portion. The second jaw assembly includes a second handle portion, a second jaw portion, a second pivot portion disposed between the second handle portion and the second jaw portion, and a second rail disposed on one of the second pivot portion and the second handle portion. The second rail is shorter than the first rail. A pivot member rotatably couples the first pivot portion to the second pivot portion such that the first jaw assembly and the second jaw assembly pivot with respect to each other between at least an open position and a closed position. A lock button is slidingly coupled to the first rail and selectively slidingly coupled to the second rail when the first jaw assembly and second jaw assembly are in the closed position. A resilient member is disposed between the lock button and the first rail to inhibit sliding movement of the lock button.

In another embodiment, the invention provides a pliers. The pliers includes a first jaw, a first handle extending from the first jaw, and a first rail extending from the first handle. The first rail includes a jaw end and a handle end. A second jaw is coupled in pivoting relation to the first jaw between at least an open position and a closed position, the first jaw and the second jaw defining a nose of the pliers. A second handle extends from the second jaw, and a second rail extends from the second handle. The second rail is substantially parallel to the first rail when the second jaw is in the closed position, and the second rail is shorter than the first rail. A lock button is slidingly coupled to the first rail and selectively coupled to the second rail when the second handle is in the closed position, and the first handle fixedly coupled to the second handle when the lock button is coupled to the second rail. A resilient member is disposed between the first rail and the lock button, whereby the resilient member inhibits sliding movement of the lock button.

Other aspects of the invention will become apparent by consideration of the detailed description and accompanying drawings.

BRIEF DESCRIPTION OF THE DRAWINGS

FIG. 4 is a side view of an electrician's pliers according to another embodiment of the invention.

FIG. 5 is a cross section of the electrician's pliers of FIG. 4, taken along section line 5-5.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
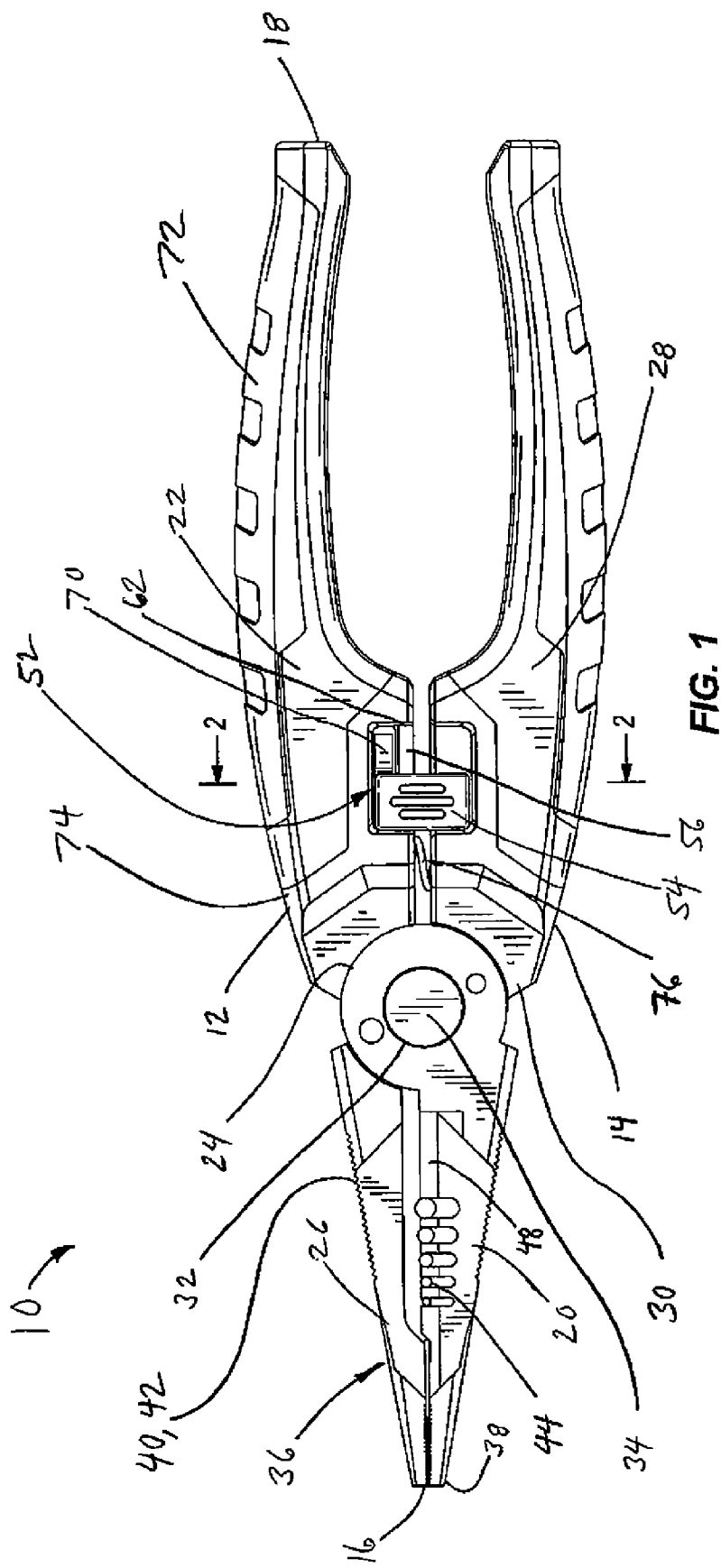
FIG. 1 is a side view of an electrician's pliers according to one embodiment of the invention.

FIG. 1 illustrates a pliers 10 according to one embodiment of the invention, and in particular, the illustrated pliers 10 is an electrician's pliers. The pliers 10 include a first member 12, or jaw assembly, and a second member 14, or jaw assembly. Each member 12, 14 has a jaw end 16 and a handle end 18. The first member 12 includes a first jaw portion 20, a first handle portion 22 and a first pivot portion 24 disposed between the first jaw portion 20 and the first handle portion 22. The second jaw assembly 14 includes second jaw portion 26, a second handle portion 28, and a second pivot portion 30 disposed between the second jaw 26 portion and the second handle portion 28. The first pivot portion 24 and second pivot portion 30 each define a pivot aperture 32. The first member 12 is pivotally coupled to the second member 14 about a pivot pin 34 disposed within the pivot apertures 32.

The first jaw portion 20 and second jaw portion 26 together define a nose 36 of the pliers 10. Each jaw portion 20, 26 tapers to a narrow point 38, and therefore the pliers 10 may be described as "needle-nose" pliers. Each of the jaw portions 20, 26 includes a plurality of ribs or ridges 40 that create a textured area 42 at the nose 36 of the pliers.

Figure 3:
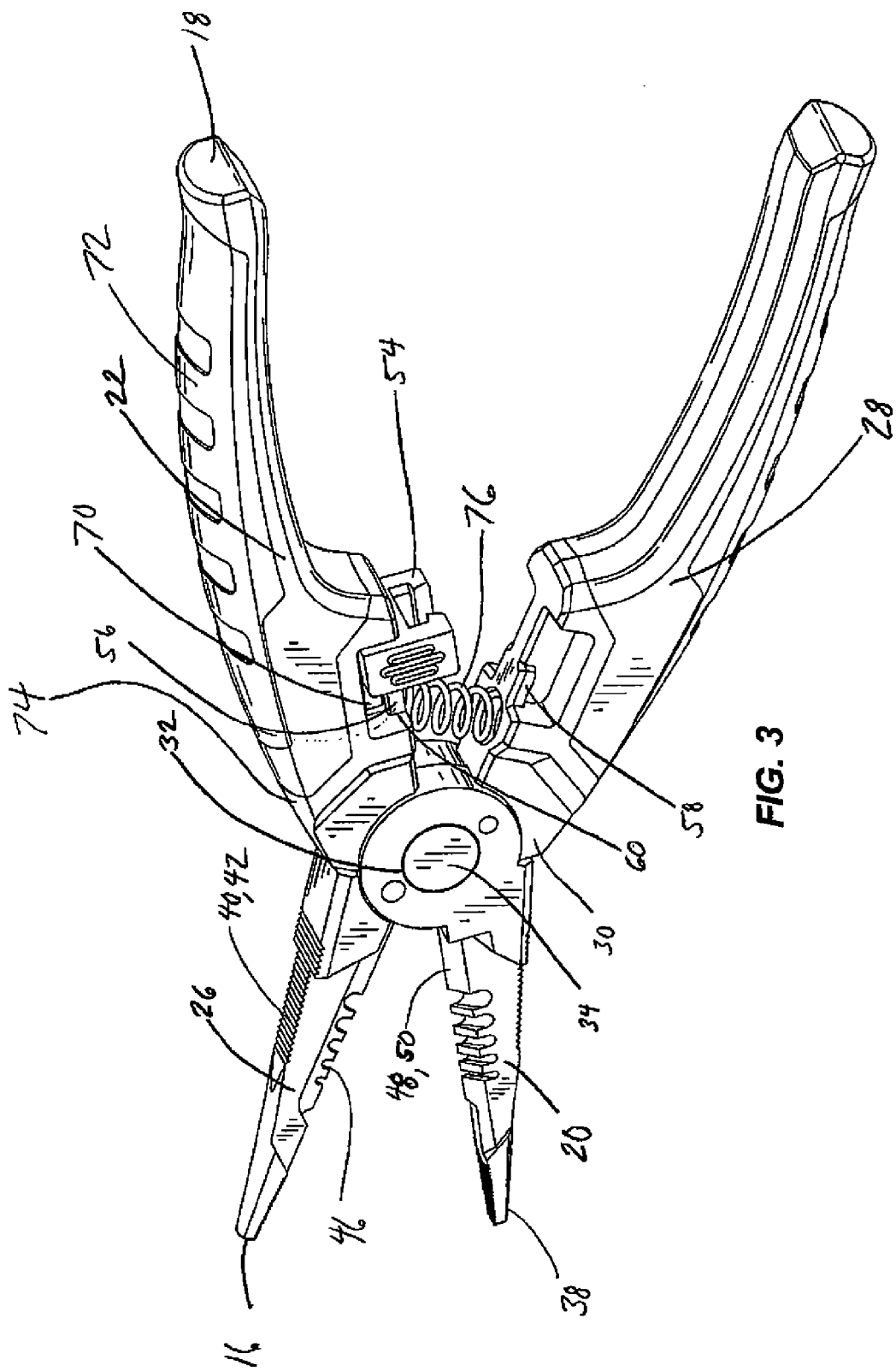
FIG. 3 is a perspective view of the electrician's pliers of FIG. 1, illustrated in an unlocked and open state.

As shown in FIG. 1, apertures 44 extend through the nose of the pliers 10. With reference to FIG. 3, a half 46 of each aperture 44 is formed in each of the jaw portions 20, 26. The apertures 44 are used to strip insulation from a wire, without substantial penetration of the underlying wire core. Each aperture 44 has a different diameter so that each aperture may be used to strip a different size wire.

In addition to the apertures 44 for wire-stripping, the first jaw portion 20 and second jaw portion 26 each include a beveled edge 48. The beveled edges 48 act in conjunction to define a cutter 50 for wire or the like.

Figure 2:
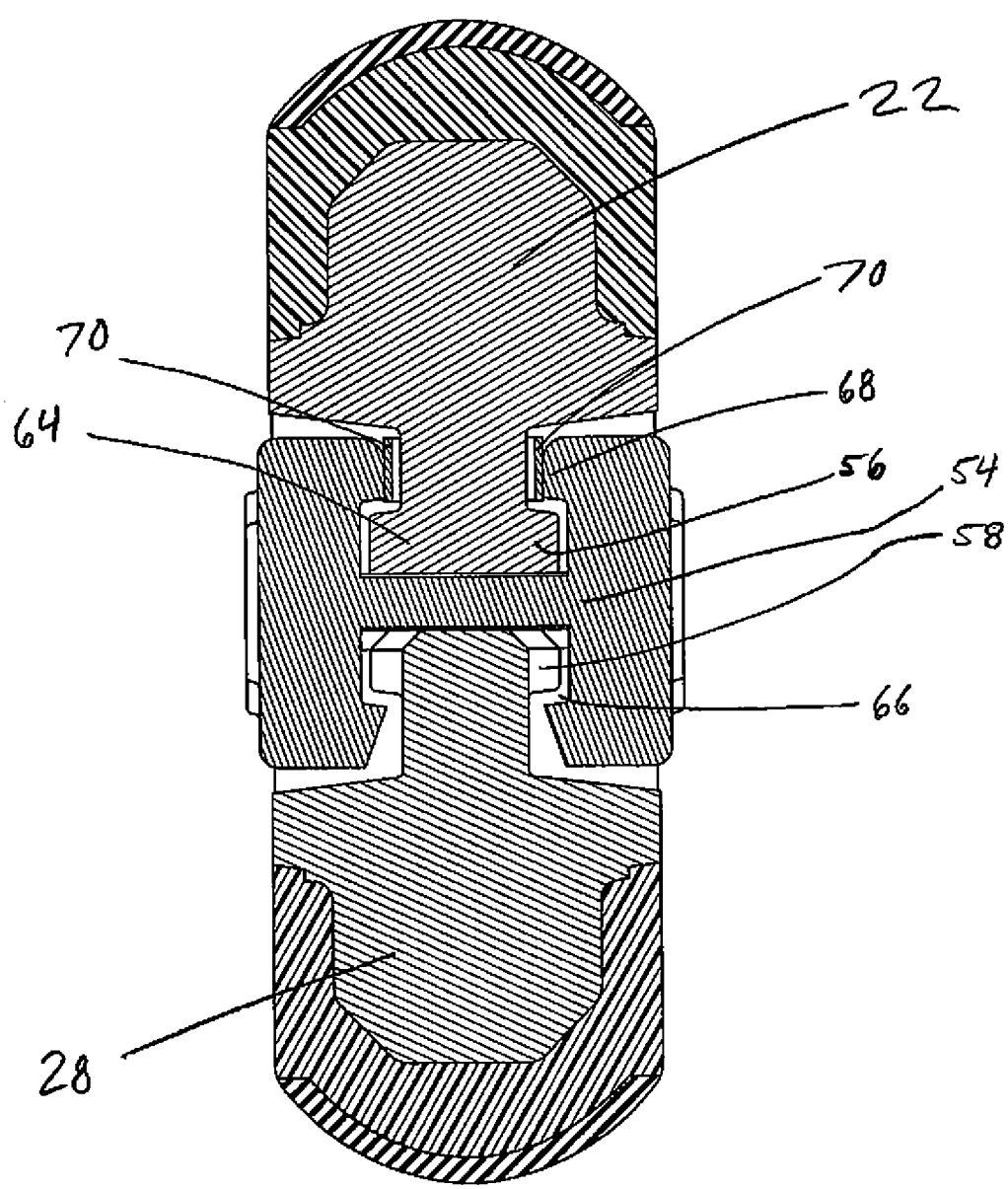
FIG. 2 is a cross-sectional view taken along section line 2-2 of FIG. 1

Referring to FIGS. 1-3, the pliers 10 include a lock assembly 52. The lock assembly 52 includes a locking button 54 slidably coupled to a first guide rail 56 on the first handle portion 22. The locking button 54 is selectively, slidably coupled to a second guide rail 58 on the second handle portion 28. The first guide rail 56 has a jaw end 60 (FIG. 3) and a handle end 62 (FIG. 1). As shown in FIG. 2, the first guide rail 56 and second guide rail 58 each have a T-shaped cross-section 64. The second guide rail 58 is shorter than the first guide rail 56. When the pliers 10 is closed, as illustrated in FIGS. 1 and 2, the first guide rail 56 and second guide rail 58 are substantially parallel.

As shown in FIG. 2, the locking button 54 defines a pair of opposed, T-shaped slots 66. Each T-shaped slot 66 corresponds generally to the cross-section 64 of the first guide rail 56 and second guide rail 58. Each slot 66 includes a pair of retaining flanges 68 for coupling the locking member 54 to the respective guide rail 56, 58.

With the members 12, 14 in a closed position, as illustrated in FIG. 1, the locking button 54 is positioned toward the jaw end 60 of the first guide rail 56, thereby engaging the second guide rail 58 and locking the pliers 10 closed. To unlock the pliers 10, the locking button 54 is slid toward the handle end 62 of the first guide rail 56. As shown in FIG. 3, with the locking button 54 at the handle end 62 of the first guide rail 56, the locking button 54 is no longer engaged to the second guide rail 58 and the members 12, 14 are separated to the illustrated open position.

As best shown in FIG. 2, a pair of resilient members 70 is disposed between the first guide rail 56 and the locking button 54. In the illustrated embodiment, each resilient member 70 is an elongated, rectangular member disposed substantially parallel to the first guide rail 56, and in particular, a leaf spring. In further embodiments, the resilient members 70 may be formed of plastic, rubber, or other non-metallic resilient materials. The resilient members 70 apply tension between the first guide rail 56 and the locking button 54, which inhibits the locking button 54 from sliding into engagement with the second guide rail 58 while in use. In some embodiments, the resilient members 70 bias the locking button 54 toward at least one of the jaw end 60 and the handle end 62 of the first guide rail 56. More particularly, the resilient member 70 biases the locking button 54 away an intermediate position, between the jaw end 60 and the handle end 62 of the first guide rail 56. Thus, the resilient member 70 inhibits the locking button 54 from unintentionally engaging or disengaging the second guide rail 58.

In the illustrated embodiment, the jaw portions 20, 26, handle portions 22, 28, and pivot portions 24, 30 of the each member 12, 14 are formed as one piece from a metal such as an alloy steel. The handle portions 22, 28 are both covered with a rubber over-mold 72. The over-molds 72 provide extra durability, increase user comfort, and reduce slippage of the user's hand on the pliers 10. The over-mold 72 is substantially flush with exposed metal portions 74 of the handle portions 22, 28, which helps prevent the over-molds 72 from getting caught on a tool pouch, shirt pocket, or other objects.

Referring to FIGS. 1 and 3, the pliers 10 include a handle biasing member 76 disposed between the first handle portion 22 and the second handle portion 28. The illustrated handle biasing member 76 is a coil spring, though in other embodiments a leaf spring may be used. The biasing member 76 causes the pliers 10 to pivot to an open position when the handles are unlocked, thus aiding one-handed use of the pliers 10.

FIGS. 4 and 5 illustrate a pliers 110 according to another embodiment of the invention. Similar features to those illustrated in the embodiment of FIGS. 1-3 have been given similar reference numerals, with a prefix beginning with the numeral "1." The handle portions 122, 128 and the lock assembly 152 of the pliers 110 are substantially identical to those of FIGS. 1-3.

Referring to FIGS. 4 and 5, the pliers 110 includes semicircular or curved grooved edges 178 on the jaw portions 120, 126. The grooved edges 178 allow the user to use the pliers 110 to ream a pipe to remove burrs or otherwise smooth the inside of a pipe wall along a cut of the pipe. To use the pliers 110 as a reamer, the user inserts the nose of the pliers 110 into a pipe or the like, until the pipe wall contacts the grooved edges 178 and the user rotates the pipe or pliers so that the edges 178 remove burrs and smooth the pipe wall along the cut.

Also illustrated in FIG. 4, a first set of indicia 180 and a second set of indicia 182 are located next to the apertures 144. The first set of indicia 180 correspond to standard American Wire Gauge (AWG) sizes and the second set of indicia 182 correspond to standard International Standard Wire sizes so that the user knows which aperture to use to strip a particular size wire.

Accordingly, the pliers 10 and 110 may include several accessory features, such as wire strippers, a wire cutter, and a pipe reamer. In other embodiments, the pliers may include various combinations of these features. Also, while the illustrated pliers 10 is a needle nose pliers, in other embodiments, other types of pliers can include the accessory features described herein.

Although the invention has been described in detail with reference to certain preferred embodiments, variations and modifications exist within the scope and spirit of one or more independent aspects of the invention as described.

What is claimed is:

1. A hand tool comprising:
 a first jaw assembly including a first handle portion, a first jaw portion, a first pivot portion disposed between first handle portion and the first jaw portion, and a first rail disposed on one of the first pivot portion and the first handle portion;
 a second jaw assembly including a second handle portion, a second jaw portion, a second pivot portion disposed between the second handle portion and the second jaw portion, and a second rail disposed on one of the second pivot portion and the second handle portion, the second rail being shorter than the first rail;
 a pivot member rotatably coupling the first pivot portion to the second pivot portion such that the first jaw assembly and the second jaw assembly pivot with respect to each other between at least an open position and a closed position;
 a lock button slidingly coupled to the first rail and selectively slidingly coupled to the second rail when the first jaw assembly and second jaw assembly are in the closed position; and
 a resilient member disposed between the lock button and the first rail to inhibit sliding movement of the lock button, wherein the resilient member biases the lock button toward at least one end of the first rail when the jaws are in the open position.

2. The hand tool of claim 1, wherein the resilient member is a leaf spring.

3. The hand tool of claim 1, wherein the resilient member is disposed substantially parallel to the first rail.

4. The hand tool of claim 1, wherein the first rail has a first end and a second end, and wherein the resilient member biases the lock button toward at least one of the first end and the second end.

5. The hand tool of claim 4, wherein the resilient member biases the lock button away from an intermediate position between the first end and the second end.

6. The hand tool of claim 1, wherein the resilient member comprises a first leaf spring disposed on a first side of the first rail and a second leaf spring disposed on a second side of the first rail.

7. The hand tool of claim 1, wherein the first rail has a T-shaped cross section and the locking button defines a T-shaped slot for receiving the first rail.

8. The hand tool of claim 1, further comprising a biasing member disposed between the first jaw assembly and the second jaw assembly, such that the first jaw assembly and second jaw assembly are biased to the open position.

9. The hand tool of claim 8, wherein the biasing member is a coil spring.

10. The hand tool of claim 1, wherein at least one of the first jaw portion and the second jaw portion defines a plurality of apertures for stripping a wire.

11. The hand tool of claim 10, wherein the first jaw portion and second jaw portion each include grooved edges.

12. The hand tool of claim 1, wherein the first handle portion includes a resilient over-molding.

13. A pliers, comprising:
a first jaw;
a first handle extending from the first jaw;
a first rail extending from the first handle, the first rail including a jaw end and a handle end;
a second jaw, the second jaw coupled in pivoting relation to the first jaw between at least an open position and a closed position, the first jaw and the second jaw defining a nose of the pliers;
a second handle extending from the second jaw;
a second rail extending from the second handle, the second rail being substantially parallel to the first rail when the second jaw is in the closed position, and the second rail being shorter than the first rail;
a lock button slidingly coupled to the first rail and selectively coupled to the second rail when the second handle is in the closed position, the first handle fixedly coupled to the second handle when the lock button is coupled to the second rail;
a resilient member disposed between the first rail and the lock button, the resilient member inhibiting sliding movement of the lock button, wherein the resilient member biases the lock button toward at least one of the jaw end and the handle end when the jaws are in the open position.

14. The pliers of claim 13, wherein the resilient member comprises a first resilient member and a second resilient member.

15. The pliers of claim 13, wherein the resilient member is disposed substantially parallel to an axis defined by the first rail.

16. The pliers of claim 13, wherein the resilient member comprises a leaf spring.

17. The pliers of claim 13, wherein the first rail and second rail each have a T-shaped cross section.

18. The pliers of claim 17, wherein the lock button includes a pair of T-shaped slots, each for receiving one of the first and second handles.

19. The pliers of claim 13, wherein at least one of the first jaw and second jaw defines a plurality of apertures for stripping an insulating jacket from a wire.

20. The pliers of claim 13, wherein the nose includes grooved edge portions.

* * * * *